(No Model.)
W. C. ANDREWS.
APPARATUS FOR THE PURIFICATION OF GAS.
No. 426,092. Patented Apr. 22, 1890.
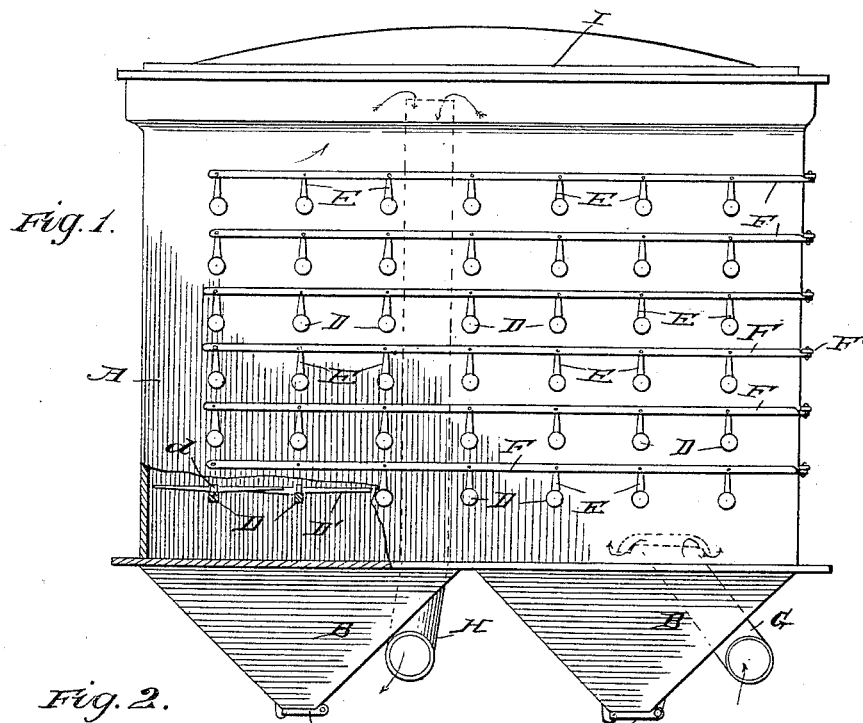
Fig. 1.
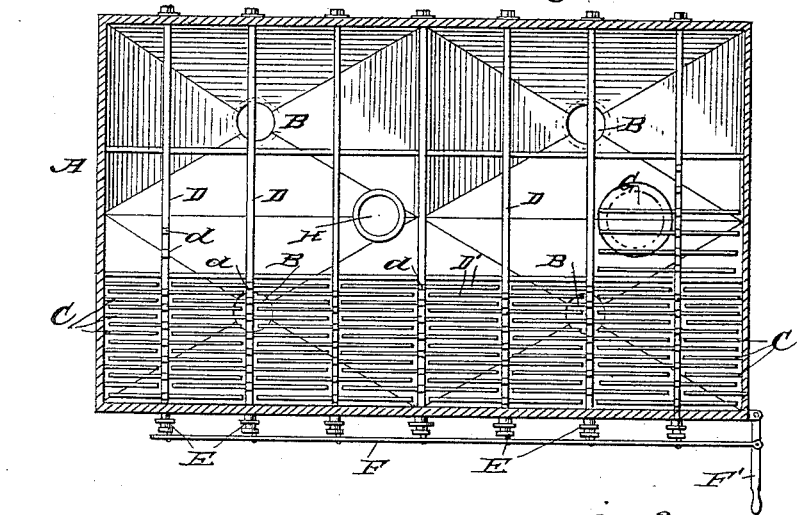
Fig. 2.
Fig. 3.
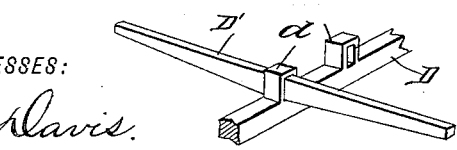
WITNESSES:
W. R. Davis.
C. Sedgwick
INVENTOR:
W. C. Andrews
BY Munn & Co.
ATTORNEYS.

UNITED STATES PATENT OFFICE.

WALLACE C. ANDREWS, OF NEW YORK, N. Y.

APPARATUS FOR THE PURIFICATION OF GAS.

SPECIFICATION forming part of Letters Patent No. 426,092, dated April 22, 1890.

Application filed August 13, 1888. Serial No. 282,500. (No model.)

*To all whom it may concern:*

Be it known that I, WALLACE C. ANDREWS, of the city, county, and State of New York, have invented a new and Improved Apparatus for the Purification of Gas, of which the following is a full, clear, and exact description.

This invention relates to the purification of illuminating-gas.
Heretofore in the purification of gas the gas has either been led over purifying material lying quiescent in a compact body or has been passed through such. In the former case the purifying material soon becomes coated superficially by a product or by products, absolutely inert so far as purification is concerned, formed with the purifying material by a substance or by substances chemically separated from the crude gas, and soon becomes fouled superficially by deposits therefrom, while in the latter case the purifying material soon becomes coated and fouled internally by the same means, the gas making channels and these channels becoming lined with the inert product or products and with the deposits. In either case perfect purification soon ceases, allowing much of the impurities of the gas to pass on, and in both cases the great bulk of the purifying material employed is kept from operation. The only remedy has been to stop the current of gas or to deflect the same to another purifier, and this at great expenditure of labor and with unnecessary loss of time, to continuously supply new purifying material or to turn or stir up the old to present new surfaces.

The objects of the present invention are to overcome these difficulties, to make the operation continuous, and thoroughly and directly to purify gas in a simple, practical, efficient, and comparatively inexpensive manner.

With these objects in view the invention consists in the combination, with a closed casing provided with a gas-induction and a gas-eduction pipe, of one or more open trays or screens adapted to receive motion; furthermore, in the combination, with a closed casing provided with a gas-induction and a gas-eduction pipe and with discharge hopper or hoppers, of one or more open trays or screens adapted to receive motion; furthermore, in the combination, with a casing, of one or more series of shafts, each shaft being provided with cross-pieces or arms; furthermore, in the combination, with a casing provided with rigidly-attached rows of slats or arms, of shafts provided with cross-pieces; furthermore, in the combination, with a casing, of one or more series of shafts provided with cross-pieces or arms, the cross-pieces or arms on each shaft alternating with those on the adjacent shaft, and a rod attached to each series of shafts for rocking the shafts of each series, thus oscillating the arms and moving each screen; and, finally, the invention consists in the combination, with the casing, the shafts provided with the arms and with cranks, and the rods, of levers for moving the rods.

In the accompanying drawings, forming part of this specification, and in which like letters of reference indicate corresponding parts, Figure 1 is a side elevation of a gas-purifying apparatus capable of carrying my invention into effect, with a portion of the side broken away to show some of the interior parts. Fig. 2 is a plan view of the apparatus with the top removed, and Fig. 3 is a perspective view of one of the details of construction.

In the drawings, A designates a casing, the bottom of which is formed with hoppers B B, closed by a valve $b$. At each end of the casing and within the same are rigidly attached rows of slats or arms C, placed in tiers, the tiers being of suitable distance apart, and across the casing are rows of horizontal shafts D D, projecting from the side of the casing through suitable stuffing-boxes, likewise placed in tiers and nearly in horizontal plane, respectively, with the rows of rigid arms C, and being each provided with a crank of any suitable size, say about one foot in length.

Each shaft D is provided with a series of transverse eyes, apertured lugs, or loops $d$, and in these eyes are held series of movable arms, slats, or cross-pieces D' D', of hard wood, metal, or other suitable material, preferably enlarged at the center, and there held by being driven into the eye. The shafts D are provided with cranks or other devices E, and to the cranks of each row of shafts are attached rods F, which may have levers F' for operating them. It will be clear that as one of these rods F is moved by its lever, all the shafts of that particular row will be rocked, and as the shafts are rocked the movable arms will be oscillated. Each row of shafts may be rocked separately, or their rods may be so connected as to rock two or more of them simultaneously.

When the movable arms or cross-pieces D' are in a horizontal position, they are in the same horizontal plane with the fixed arms C, and the outer portions of the arms of the outer shafts form with the fixed arms and the inner portions of the arms of the outer shafts form with the outer portions of the arms of the adjoining shafts, and so on mutually in each row, a grating or open platform to support a layer of the purifying material. When the lever is moved back and forth, each of the shafts is rocked or shaken and the several rows of slats are moved up and down in such manner that any material which may be placed upon them is agitated and passed through, down to the next course of slats below, being left comparatively level there. The levers being so moved that the cranks are in an upright position, the slats will again be in a level position and the material upon each layer above can be worked in the same manner, the material being deposited upon the layer next below by a continual graduated movement, and in like manner the process may be continued, the material being moved from the top toward the bottom, whence it may be drawn from the purifier, while new material may be constantly placed upon the top layer of slats, so that each layer shall contain its proper proportion of the purifying material, or the whole shall be sifted down from layer to layer in a continuous manner.

As ordinarily constructed, purifying-boxes are generally only from four to six feet in depth, with stationary screens or trays for the purifying material, and to get rid of this when it is spent it has to be removed separately from each tray.

In the present case the casing may be of great depth—say of twenty-four feet, more or less. The screens or trays are movable, and the purifying material has not to be removed separately from each tray or scraped or dumped therefrom to a waste-box, but passes successively from one tray to another, being sifted downward.

The gas-inlet pipe is designated by the letter G, while the gas-outlet pipe is designated by the letter H. The gas-outlet pipe is of course beyond the first layer of purifying material.

I indicates a removable cover.

It is preferred to have the horizontal shafts in each row about one and one-half foot apart and to have the movable arms slightly less than three feet in length with from an inch to an inch and one-half space between adjoining strips. By this construction a great saving of labor is effected and a much larger quantity of gas than usual can be purified in proportion to the ground-space occupied, since not only is a great quantity of material immediately presented in active form, but as the tiers of purifying material may be in any number and be successively discharged a purifier may be of great height, thus taking the place of many separate purifiers.

The operation is as follows: Gas entering the lower part of the casing passes upward through the lower layer of purifying material, and so on to the outlet. Either continually or when the passing gas is recognized by suitably-situated pet cocks to be wanting in requisite purity, one, more, or all of the rows of shafts will be rocked and the purifying material will be agitated and fall in a shower or stream to trap the appropriate impurities of the gas. Fresh purifying material is supplied from the top, as desired, and thus successive layers are fed forward. It will be obvious that the lowest layer of purifying material will first become inert and foul, since this layer is first met by the crude gas and is supplied from the other layers, all of which have exerted a purifying effect. Consequently this layer will be dumped into the hoppers, and thence may be removed at convenience.

Should it be desired to leave the purifying material quiescent during the passage of the gas, the bottom layer of purifying material will be discharged into the hoppers, when it becomes saturated with impurities, the shafts D D being rocked or shaken for that purpose; but the bottom layer may first be disposed of, and then the shafts of all the other layers being rocked, each layer of purifying material will be lowered, and, this done, a fresh layer of material will be supplied at the top.

Having thus fully described my invention, what I claim as new, and desire to secure by Letters Patent, is—

1. In a gas-purifier, the combination, with the casing, of a lower gas-inlet and a gas-outlet, a series of horizontal sectional floors between the inlet and outlet, each floor comprising separate sections of intermeshing grids, and mechanism for tilting said sections, as described.

2. In a gas-purifier, the combination, with the casing, of a lower gas-inlet and a gas-outlet, a series of horizontal sectional floors between the inlet and outlet, each floor comprising separate sections of intermeshing grids, supporting-shafts for each section extending through the wall of the casing and provided at their end with a crank, and horizontal rods connecting the free ends of the cranks in each floor, substantially as described.

W. C. ANDREWS.

Witnesses:
LEWIS COON,
O. P. SHAFFER.